United States Patent [19]

Otsuka

[11] Patent Number: 5,308,200
[45] Date of Patent: May 3, 1994

[54] METHOD OF PRODUCING A DIE FORMING LENS FISHEYE STEPS

[75] Inventor: Yoshinori Otsuka, Shizuoka, Japan

[73] Assignee: Koito Manufacturing Co., Ltd., Tokyo, Japan

[21] Appl. No.: 986,786

[22] Filed: Dec. 8, 1992

[30] Foreign Application Priority Data

Dec. 13, 1991 [JP] Japan .................................. 3-351322

[51] Int. Cl.$^5$ ............................ B23C 1/00; F21Q 3/00
[52] U.S. Cl. ..................................... 409/132; 359/743; 362/80; 362/338
[58] Field of Search ................ 409/131, 132; 362/334, 362/335, 337, 338, 339, 340, 61, 80; 359/741, 742, 743, 751

[56] References Cited

U.S. PATENT DOCUMENTS

| | | | |
|---|---|---|---|
| 2,685,231 | 8/1954 | Onksen | 359/743 X |
| 4,711,527 | 12/1987 | Rimmell et al. | 350/243 |
| 4,733,335 | 3/1988 | Serizawa et al. | 362/80 |
| 4,849,861 | 6/1989 | Arima | 362/61 |
| 4,951,179 | 8/1990 | Machida | 362/61 |
| 4,993,807 | 2/1991 | Sakakibara | 362/339 X |
| 5,070,432 | 12/1991 | Kitazumi et al. | 362/61 |

FOREIGN PATENT DOCUMENTS

| | | | |
|---|---|---|---|
| 686179 | 5/1964 | Canada | 362/338 |
| 526336 | 2/1990 | European Pat. Off. | 362/339 |
| 447233 | 4/1949 | Italy | 362/340 |
| 878215 | 9/1961 | United Kingdom | 362/339 |
| 920430 | 3/1963 | United Kingdom . | |
| 1234005 | 6/1971 | United Kingdom . | |
| 1272068 | 4/1972 | United Kingdom . | |
| 1339425 | 12/1973 | United Kingdom . | |
| 2167690 | 6/1986 | United Kingdom . | |

*Primary Examiner*—William Briggs
*Attorney, Agent, or Firm*—Sughrue, Mion, Zinn, Macpeak & Seas

[57] ABSTRACT

A method of producing a die for use in forming fisheye steps in an automobile lens having both straight and curved portions. The plurality of fisheye steps formed on the curved portion of the lens are divided into generally parallelogram-like sections. The die comprises plural concave portions that are arranged to form the fisheye steps when applied in a lens forming process. In the die producing method, the boundary lines between concave portions corresponding to the respective fisheye steps are connected to produce approximately a straight line, to thereby improve an appearance of the fisheye steps. Further, the concave portions that are divided by longitudinal lines extending in a first direction and lateral lines obliquely intersecting the longitudinal lines and extending in a second direction are produced by NC machining using an end mill. The end mill is controlled to have a locus generally in parallel with the longitudinal lines, in which vector control is added when the end mill passes a start side lateral line that is expected to become a boundary between the concave portions and passes an end side lateral line to enter the next concave portion so that the locus of the end mill becomes perpendicular to these lateral lines.

3 Claims, 12 Drawing Sheets

METHOD OF PRODUCING A DIE FORMING LENS FISHEYE STEPS

BACKGROUND OF THE INVENTION

1. Field of the Invention

The present invention relates to a novel method of producing a die for forming fisheye steps on a lens and, in particular, a method which can improve the appearance of the fisheye steps by making a connection line, formed from the boundary lines between the adjacent fisheye steps, assume a line approximating a straight line.

2. Description of the Background Art

The designing of lenses of vehicular lamps inevitably includes designing of steps which have various shapes depending on the requirements from the light distribution control and the design. For example, fisheye steps, which are formed as an unevenness on the back surface of a lens, are used in a tail lamp etc., of an automobile.

FIG. 14 shows an example a of an outer lens, and is a formed product made of a synthetic resin material.

The outer lens a has a shape consisting of a plate-like portion b and a portion c that is continuous with the portion b and is curved and twisted as reaching along the longitudinal direction to one end. With this shape, the lens surface matches the external shape of a vehicle body.

As shown in FIG. 15, a large number of fisheye steps d, d, . . . are formed on the back surface (light incident surface) of the outer lens a so as to be arranged vertically and horizontally with each convex step occupying an approximately rectangular unit section e, e, . . . .

Since the vertical and horizontal cross-sections of the fisheye steps d, d, . . . generally have a shape of a circular arc, the fisheye steps d, d, . . . refract the light directly coming from a light source (not shown) or the light reflected by a reflection surface and deflect such light vertically and horizontally, to thereby produce a distribution of light somewhat diffused vertically and horizontally.

Therefore, when the plate-like portion b of the outer lens a is viewed from the front side, the vertical and horizontal boundary lines of the steps are seen through the lens as an orthogonal grid-like pattern; however, the curved portion c is designed such that the boundary lines of the steps form a non-orthogonal grid in accordance with a curvature of this portion.

In this design, in order to obtain a good appearance of the lines seen through the outer lens a, it is important to connect the step boundaries extending in the longitudinal direction of the outer lens a so that they form a line extending as closely in the horizontal direction as possible, and to connect the step boundaries extending in the vertical direction so that they form a line as close to a straight line as possible.

FIGS. 16(a) and 16(b) conceptually show a method of machining a die for the outer lens a, and FIGS. 19(a) and 19(b) show the part of the die that serves to form the fisheye steps on the curved portion c of the outer lens a.

The die machining process is automated using an NC machine tool or a machining center. NC machining data, which includes such information as machining conditions and movement instructions for a cutting tool, is generated based on a lens shape model obtained by a CAD system, and a die is machined by controlling the cutting tool in accordance with the NC machining data.

In order to form convex shapes of the fisheye steps, the die material is cut by an edged tool g called a ball end mill to produce concave portions f, f, . . . that correspond to the intended convex shapes, as shown in FIG. 17. The movement of the ball end mill is controlled so that it, takes a locus h as shown in plan views of FIGS. 16(a) and 16(b), and generally rectangular (as projected to a plane) concave portions f, f, . . . are formed by repeating this cutting movement a plurality of times.

Reference character u in FIG. 16(a) represents a direction of longitudinal lines i, i, . . . formed as the boundaries of the concave portions f, f, . . . , and character which is perpendicular to uv, represents a direction of lateral lines j, j, . . . formed as the boundaries of the concave portions f, f, . . . .. A vector v_I represents a movement direction of the end mill g with respect to a lateral line js on the start side, and a vector v_O represents a movement direction of the end mill g with respect to a lateral line je on the end side.

It is noted that the terms "start" and "end" with respect to the lateral lines j, j, . . . are defined relative to the movement of the end mill g, and are employed for the convenience of description.

As shown in FIGS. 16(a) and 16(b), the end mill g is controlled so as to enter the concave portion f in parallel with the longitudinal lines i, i, . . . , proceed while cutting the die material, and exit also in parallel with the longitudinal lines i, i, . . . .

The cutting is performed so that the cutting depth of the concave portions f, f, . . . becomes larger as the position reaches the centers of the concave portions f, f, . . . and smaller as the position reaches the longitudinal and lateral boundary lines.

However, according to the above method, the adjacent lateral lines i, i, . . . do not join smoothly as shown in FIG. 19(b). As a result (i.e., by transfer), irregular lateral lines appear in the outer lens a of the formed product, and the appearance of the fisheye steps d', d', . . . are deteriorated as shown in FIG. 18.

This is due to the following reasons, with reference to FIGS. 16(a) and 16(b). If the concave portions f, f, . . . are formed such that a first concave portion coincides with a second concave portion by moving the first one in the v direction, the lateral lines are connected to form a straight line but also extend obliquely, i.e., in the v direction. To avoid this phenomenon in which the lateral lines gradually deviate from the horizontal direction, it is necessary to shift the concave portions f, f, . . . in the u direction little by little.

In the case of the fisheye steps formed on the plate-like portion b of the outer lens a, since their boundary lines assume an orthogonal grid form and the individual steps are separated as rectangular sections, the boundary lines are joined to form straight lines. However, in the case of the fisheye steps on the curved portion c of the outer lens a, the boundary lines intersect each other to assume a non-orthogonal grid and the individual steps are separated as parallelogram sections. Therefore, if the concave portions f, f, . . . are formed by the end mill g proceeding in parallel with, the longitudinal lines i, i, . . . (see FIGS. 16(a) and 16(b)), the lateral lines j, j, . . . do not join properly, and the boundary lines of the fisheye steps after the forming, particularly the lines extending in the horizontal direction, are zigzagged, as seen in FIG. 18.

As the streamlined vehicle body design becomes a common trend in view of its desired aerodynamic characteristics and the design of the vehicle body and what is called a slanted body is employed widely, lamps are required to be designed to match the vehicle bodies so designed. As a result, the zigzagged lateral lines of the fisheye steps will be more noticeable, particularly in the curved portion of the outer lens, deteriorating the appearance.

As a result, according to the above-described method, it takes much time and work to modify the die and the machining data, which is one of the causes of reducing the efficiency of operation.

To solve this problem, it may be assumed that the locus of the end mill in forming the generally parallelogram-like concave portions is not changed (i.e., remains the same as in FIGS. 16(a) and (16) and the end mill entering and exiting positions with respect to the respective concave portions are gradually shifted in the u direction. However, in order to perform continuous machining according to this method, the control of the end mill movement becomes complex. On the other hand, discontinuous machining with respect to the v direction will cause disadvantages such as an increased machining time.

SUMMARY OF THE INVENTION

To solve the above problems, according to the invention, a method of producing a die to be used for forming, on a lens having a curved portion, a large number of fisheye steps that are divided by boundary lines into generally parallelogram-like sections in which the die is divided into concave portions corresponding to the respective fisheye steps by a first group of boundary lines extending in a particular direction and a second group of boundary lines obliquely intersecting the first group of boundary lines and extending like a straight line, is characterized by the steps of:

first, making a cutting tool enter a divided section corresponding to one concave portion while controlling a moving direction of the cutting tool so that its locus becomes perpendicular to a start side boundary line belonging to the second group of boundary lines and expected to become a boundary of the divided section;

then, moving the cutting tool relative to the die so that the cutting tool proceeds generally in parallel with the boundary lines of the divided section belonging to the first group of boundary lines; and then, controlling the movement direction so that the locus of the cutting tool becomes perpendicular to an expected end side boundary line belonging to the second group of boundary lines, and thereafter shifting to machining of a next concave portion.

BRIEF DESCRIPTION OF THE DRAWINGS

FIGS. 1(a) and 1(b) is a drawing schematically illustrating a locus of a cutting tool in an embodiment of the present invention, wherein FIG. 1(b) shows an enlarged portion of FIG. 1(a).

FIG. 2 is seen in the x-direction.

FIG. 5(a) shows a part of the die in which boundaries of concave portions are formed to assume an orthogonal grid; and FIG. 5(b) shows another part of the die in which boundaries of concave portions are formed to assume a non-orthogonal grid.

FIGS. 16(a) and 16(b) are drawings illustrating a conventional method of producing a die for fisheye steps, wherein FIG. 16(b) shows an enlarged portion of FIG. 16(a).

FIGS. 19(a) and 19(b) are drawings showing the main part of the conventional die for fisheye steps, wherein FIG. 19(b) is a clarified view of a line j in FIG. 19(a).

DESCRIPTION OF THE PREFERRED EMBODIMENTS

According to the invention, while a second group of boundary lines are formed, which extend like a straight line and obliquely intersect a first group of boundary lines that divide the concave portions corresponding to the respective fisheye steps, the movement direction control of the cutting tool is always performed so that the locus of the cutting tool becomes perpendicular to the second group of boundary lines that are expected to be the boundary lines of the concave portions when the cutting tool passes the second group of boundary lines. Therefore, in the vicinity of the intersections of the first group of boundary lines and the second group of boundary lines, the lines belonging to the second group of boundary lines can be connected to assume a line approximating a straight line.

Therefore, when such die is used to produce a lens having a curved portion, the boundary lines between the fisheye steps formed on the curved portion of the lens have a good appearance when seen through the lens. Further, it does not take much time to modify the die and the machining data.

Since continuous machining can be performed, without making the movement control of the end mill very complex, by shifting, in the forming direction of the second group of boundary lines at very small intervals, the locus of the cutting tool that is generally in parallel with the forming direction of the first group of boundary lines, the machining time is not increased considerably.

A method of producing a die for fisheye steps of the present invention is described hereinafter by way of an embodiment accompanied by the drawings.

Figure 5A:
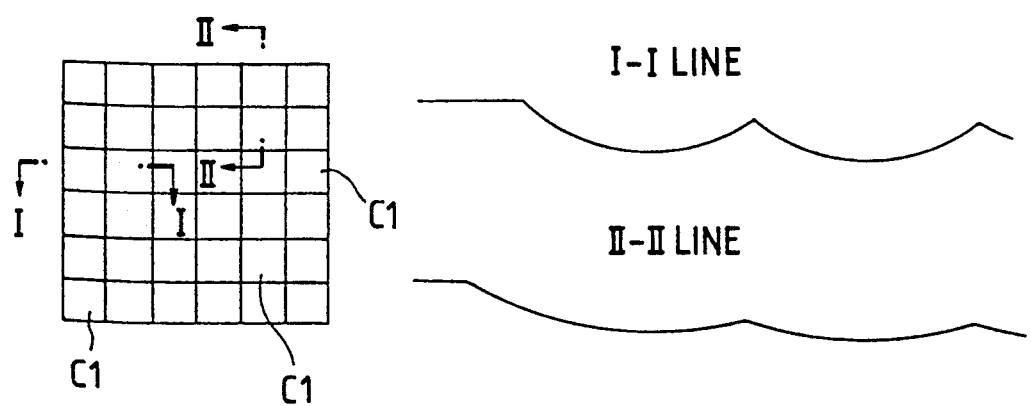
FIGS. 5(a) and 5(b) schematically show a shape of a die.
Figure 5B:
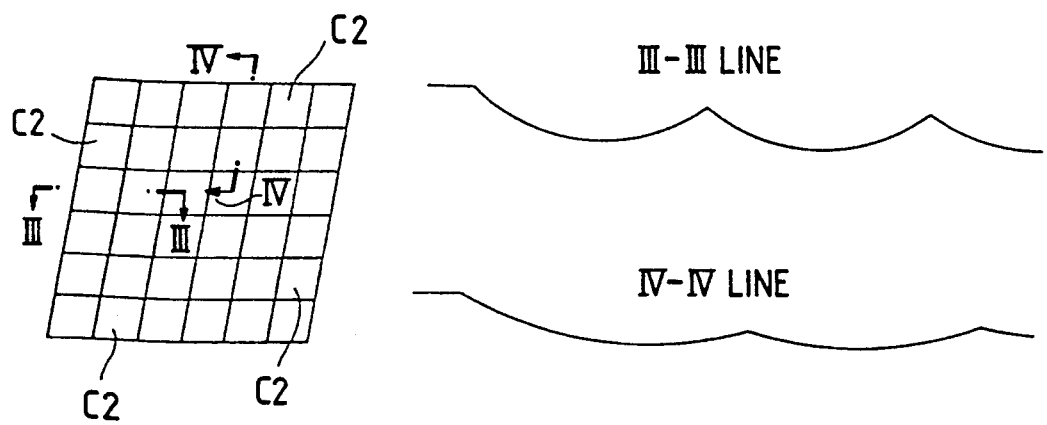

FIGS. 5(a) and 5(b) conceptually show a shape of a die.

FIG. 5(a) shows a die area corresponding to the plate-like portion of an outer lens on which the fisheye steps are to be formed.

As described above, concave portions C1, C1, ... are formed by cutting the respective sections divided by the orthogonal longitudinal and horizontal boundary lines. A cross-section of the concave portions C1, C1, ... taken along the horizontal direction at the their centers (I—I line) and a cross-section of the concave portions C1, C1, ... taken along the vertical direction at their centers (II—II line) assume a shape as obtained by connecting circular arcs, in which the former has a larger curvature and a smaller pitch than the latter.

FIG. 5(b) shows a die area corresponding to the curved portion of the outer lens on which the fisheye steps are to be formed.

In this case, concave portions C2, C2, ... are formed by cutting the sections divided by the non-orthogonal longitudinal and horizontal boundary lines. A cross-section of the concave portions C2, C2, ... taken along the horizontal direction at the their centers (III—III line) and a cross-section of the concave portions C2, C2, ... taken along a line inclined from the vertical direction at their centers (IV—IV line) assume a shape as obtained by connecting circular arcs, in which the former has a larger curvature than the latter.

A process from the die designing to the manufacture of the fisheye steps is performed according to the standard CAD/CAM process including the basic designing, detailed designing, preparation for manufacture and actual manufacture.

FIGS. 8-13 show, in a simplified manner, a process of producing, by a CAD system, a shape model of a die to be used for manufacturing the fisheye steps.

Figure 8:
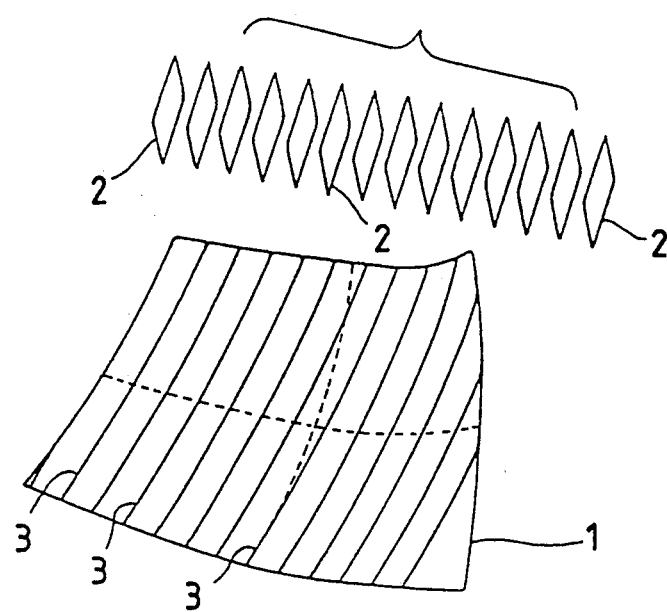
FIG. 8 is a drawing illustrating a CAD-assisted intersection line calculation in die designing.
Figure 9:
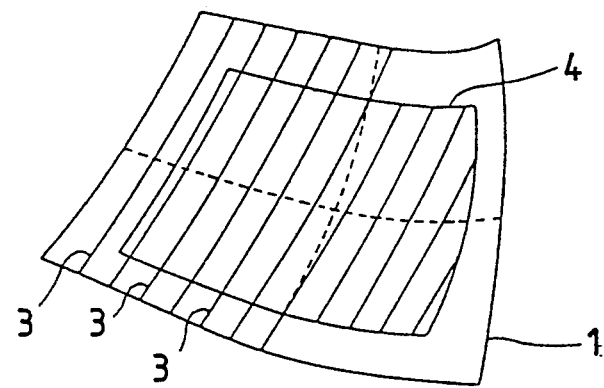
FIG. 9 is a drawing illustrating external shape trimming, which is performed subsequent to the operation of FIG. 8.

First, as shown in FIG. 8, to design a free surface 1 as a reference surface, a large number of parallel planes 2, 2, ... to generate intersection lines with the free surface 1 are prepared, and a shape of the surface 1 is determined by performing an intersection line calculation to specify curves 3, 3, ... that are the intersection lines.

Since the surface 1 thus determined has not been given an external shape of a lens yet, an external line 4 is specified (see FIG. 9) and the intersection lines are trimmed en bloc.

Figure 10:
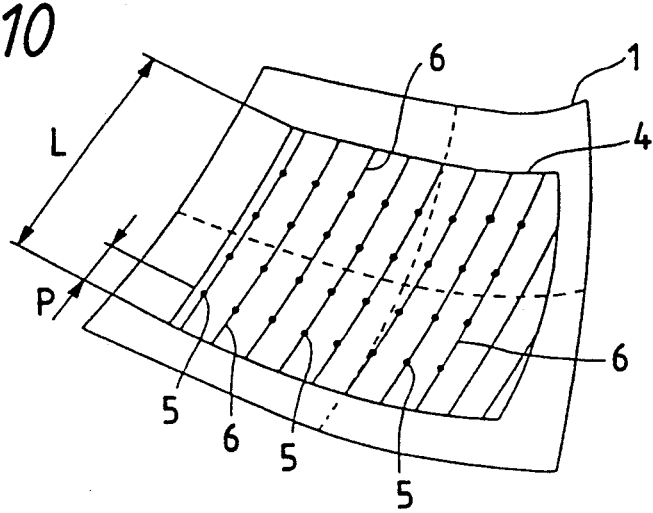
FIG. 10 is a drawing illustrating specification of equidistant dividing points on design lines, which is performed subsequent to the operation of FIG. 9.

Then, as shown in FIG. 10, design lines 6, 6, ... are generated by specifying a dividing number for each intersection line and automatically allocating dividing points 5, 5, ... at equal intervals. That is, if the length of a certain design line 6 is L, (N−1) dividing points are allocated at a fixed pitch P=L/N.

Since the dividing points 5, 5, ... are not located on the surface 1, the dividing points 5, 5, ... are projected onto the surface 1 to obtain points that reflect the dividing points 5, 5, ... and serve as control points on the surface 1. The points thus obtained are then smoothly connected (see FIG. 11).

Figure 12:
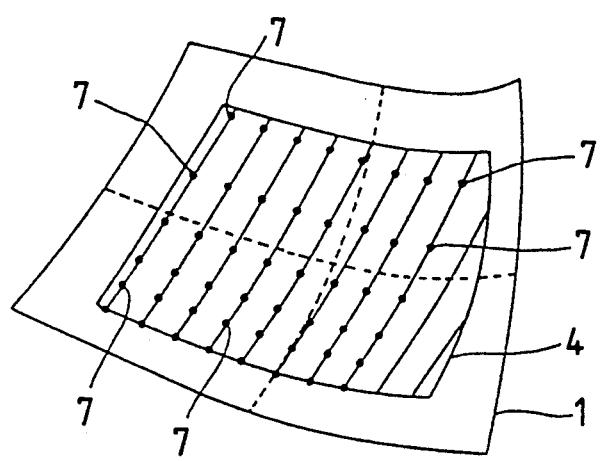
FIG. 12 is a drawing illustrating an operation of changing the intervals between the dividing points, which is performed subsequent to the operation of FIG. 11.

Then, as shown by points 7, 7, ... in FIG. 12, the positions of the dividing points on the design lines 6, 6, ... are modified so as to be distributed at specified varying pitches (not at the fixed pitch). In FIG. 12, the pitches of the points 7, 7, ... on the design lines 6, 6, . . . gradually increase as their position goes from one end of the design lines 6, 6, ... to the other.

If the dividing points on the design lines are always determined at equal intervals, the design freedom will be reduced. On the other hand, if the intervals are specified entirely freely as the respective positions, the efficiency of operation will be lowered. Therefore, it is practical that the design lines be roughly generated according to the first method and thereafter the intervals be modified.

Figure 11:
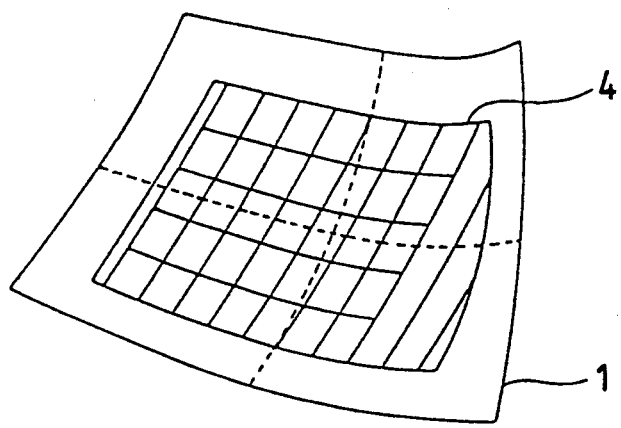
FIG. 11 is a drawing illustrating projection of the equidistant dividing points onto a curved surface, which is performed subsequent to the operation.
Figure 13:
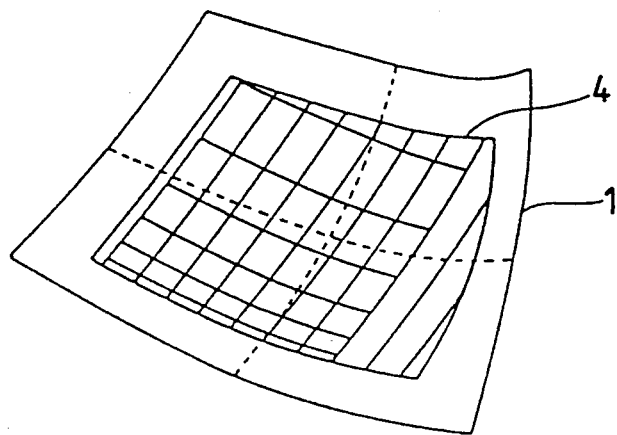
FIG. 13 is a drawing illustrating projection of the dividing points having varying intervals into the curved surface, which is performed subsequent to the operation of FIG. 12.
Figure 14:
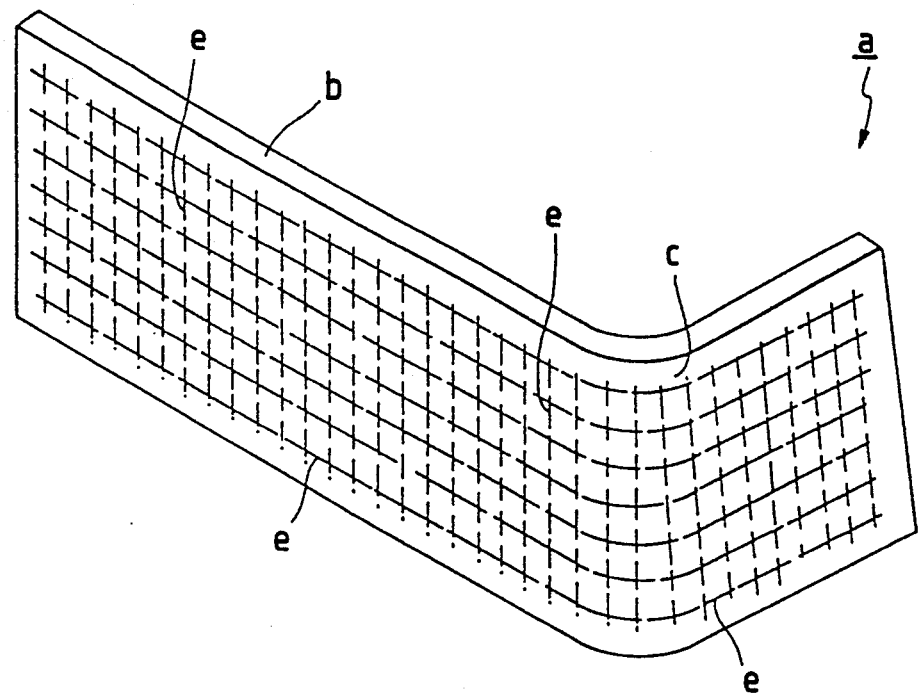
FIG. 14 is a schematic perspective view of an outer lens as seen from the front side.
Figure 15:
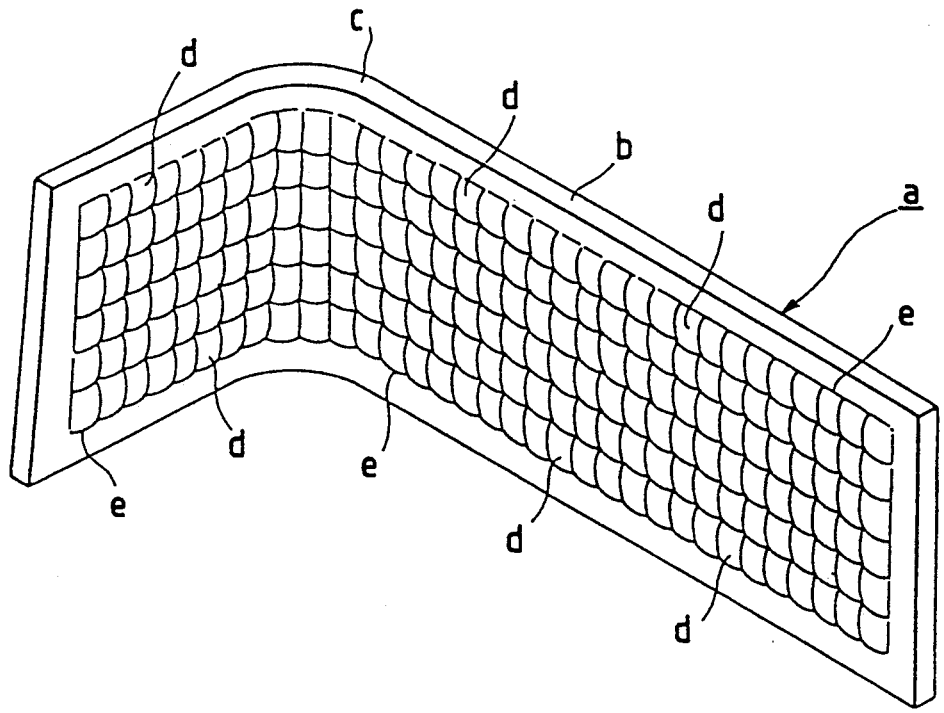
FIG. 15 is a schematic perspective view of the outer lens as seen from the back side.
Figure 16A:
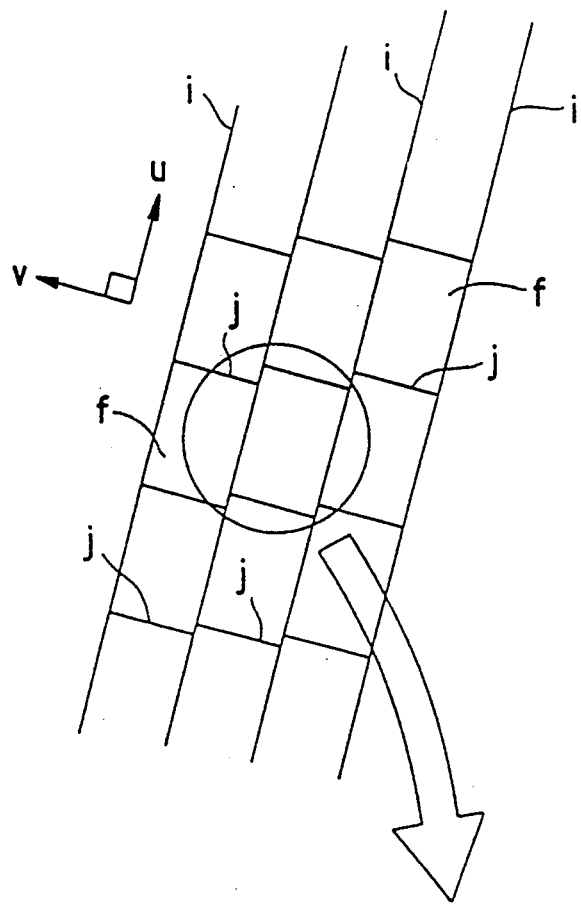
Figure 16B:
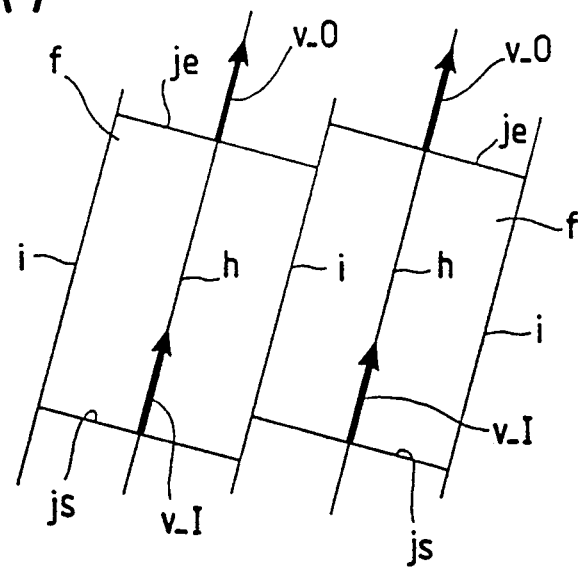
Figure 17:
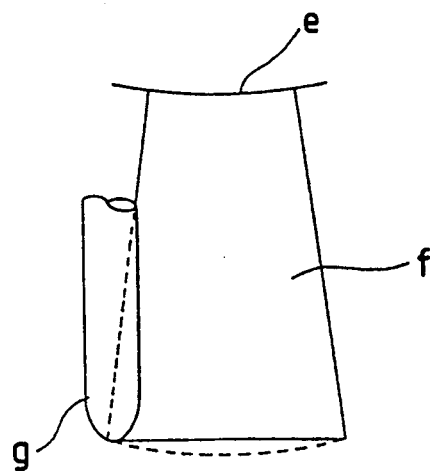
FIG. 17 is a drawing conceptually illustrating how a concave portion corresponding to a fisheye step is machined by an end mill.

Then, as in the case of FIG. 11, the dividing points are projected onto the surface 1, and the projected points are smoothly connected to produce final intersection lines (see FIG. 13).

In the subsequent CAM stage, NC machining data is generated based on the shape model obtained above. In this stage, prior to calculating loci of a cutting tool, intersections of parameterized curves on the free surface 1 are determined, intersection data is grouped by attaching names to the respective curves, and finally a computing operation is performed based on NC calculation programs.

A NC machine tool performs die machining while controlling the end mill movement based on the machining data obtained above.

Figure 1A:
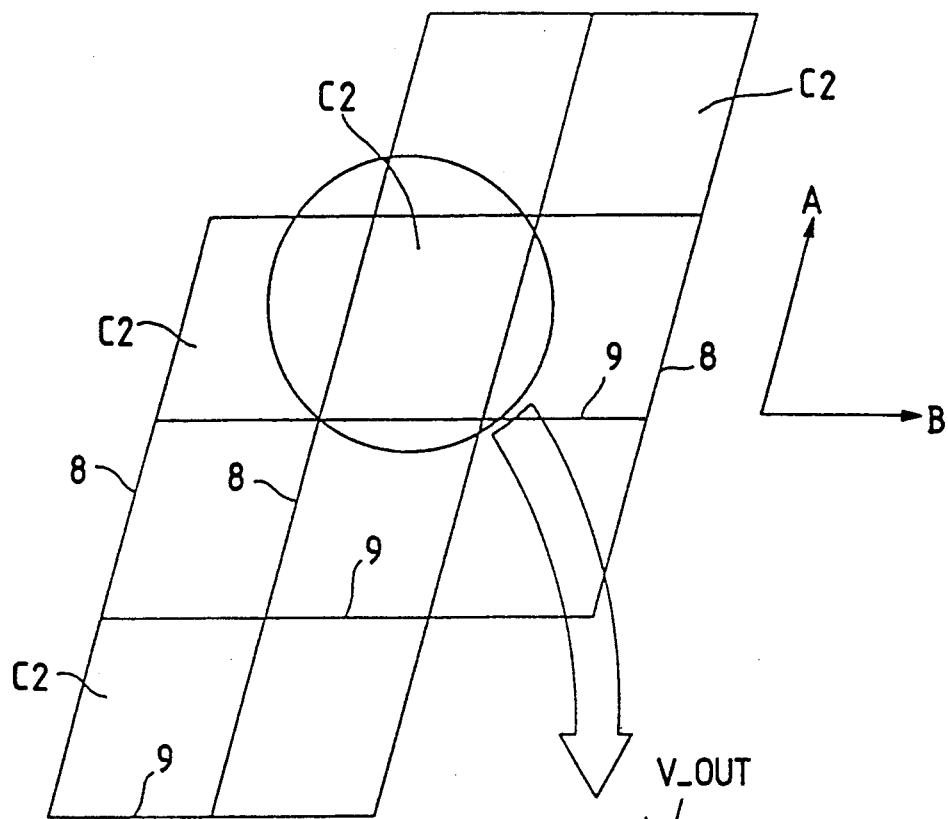
Figure 1B:
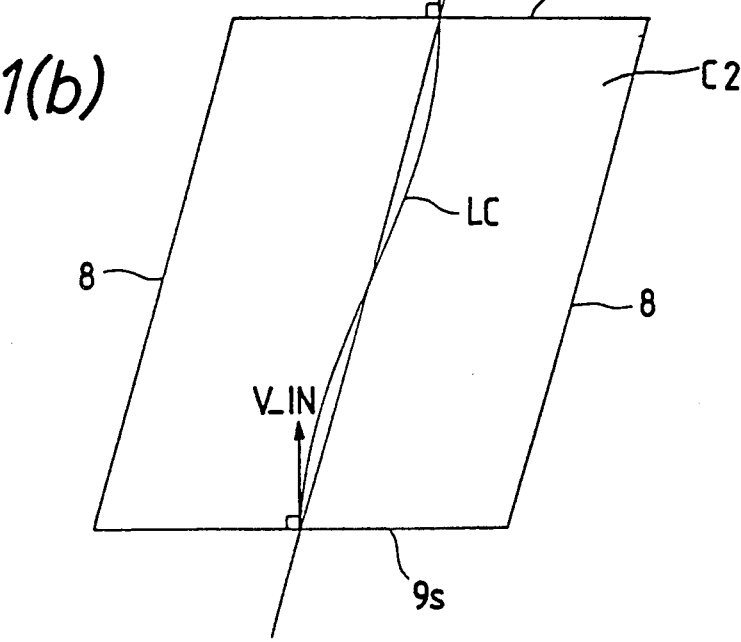
Figure 6:
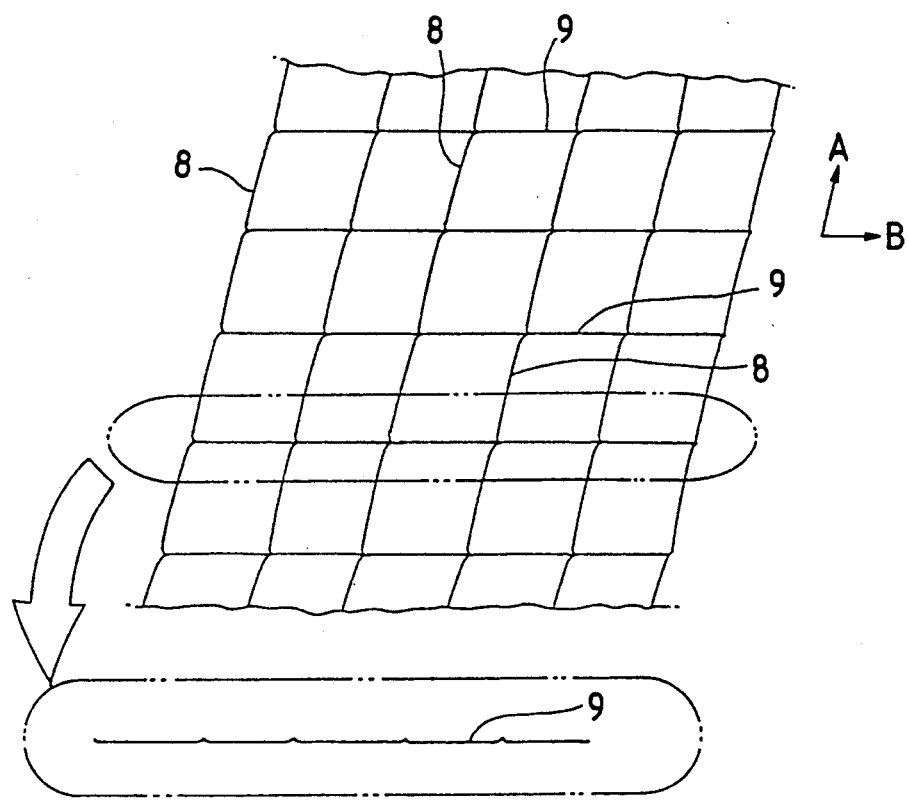
FIG. 6 is a drawing schematically showing the main part of the die according to the embodiment.

FIGS. 1(a) and 1(b) conceptually shows a method of machining a part of a die corresponding to the curved portion of an outer lens on which fisheye steps are to be formed. FIG. 6 schematically shows the main part of the die.

In FIG. 1(b) showing an enlarged part of the concave portions C2, C2, ... , a curve LC represents a locus projected onto a plane of a ball end mill with respect to the die. The concave portions C2, C2, ... having a generally parallelogram-like shape when projected onto the plane are formed by repeating the above movement control of the ball end mill a certain number of times.

An arrow A in FIG. 1 represents a direction of longitudinal lines 8, 8, ... that are formed in the longitudinal direction as boundaries between the concave portions C2, C2, .... An arrow B represents a direction of lateral lines 9, 9, ... as boundaries between the concave portions C2, C2, .... A vector V_IN is a velocity vector of the end mill entering the concave portion C2 at a start side lateral line 9s. A vector V_OUT is a velocity vector of the end mill exiting from an end side lateral line 9e.

As indicated by the vector V_IN, the end mill enters the concave portion C2 vertically with respect to the lateral line 9s (i.e., V_IN⊥9s) when projected onto the plane. Then, the end mill is controlled to change its course so as to approach the direction of the longitudinal line 8, 8, ..., and before exiting from the lateral line 9e it is controlled so that the vector V_OUT becomes perpendicular to the lateral line 9e (i.e., V_OUT⊥9e). Then, the end mill enters the next concave portion C2.

Figure 2:
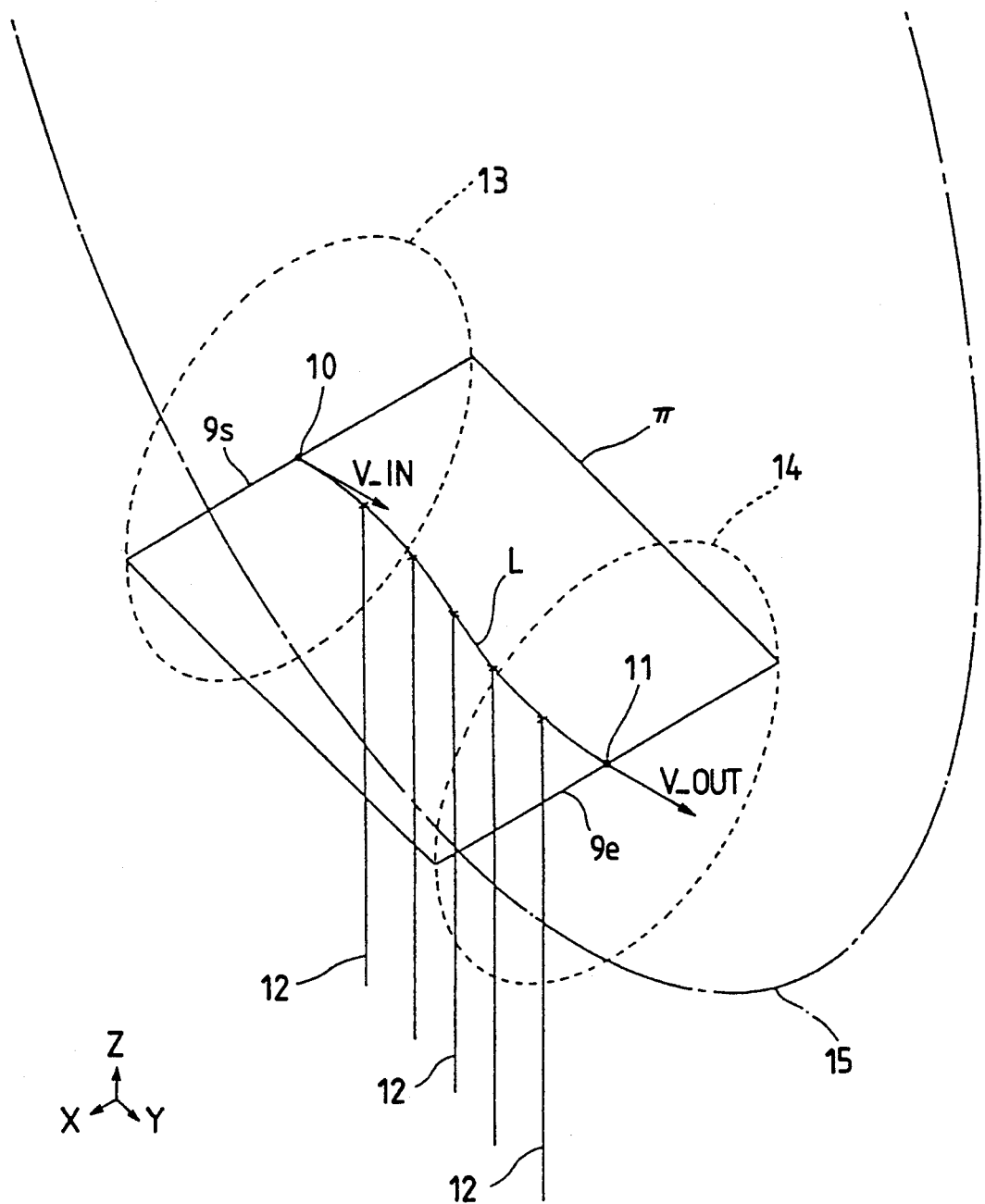
FIG. 2 is a perspective view illustrating the locus of the cutting tool of FIG. 1.
Figure 3:
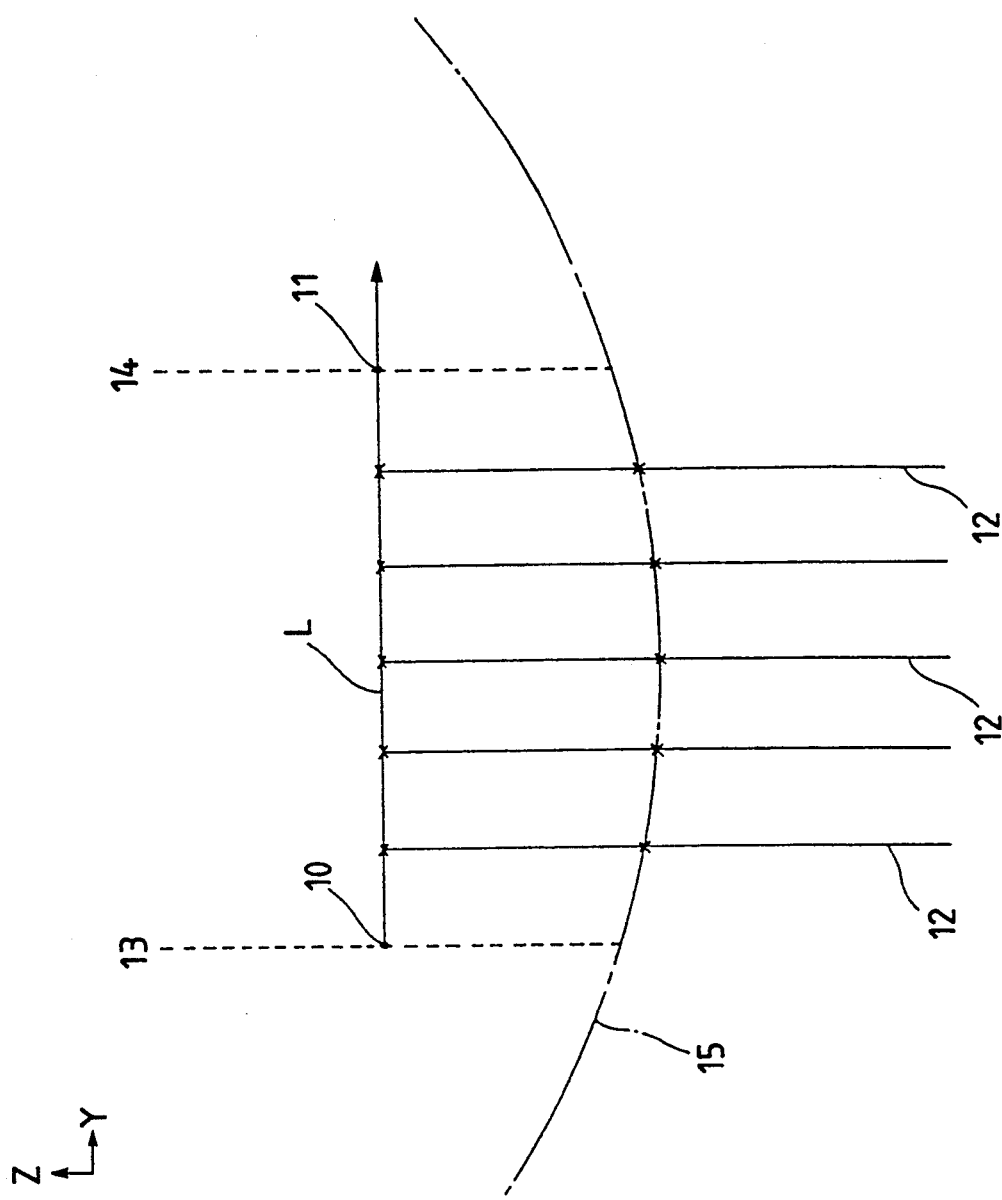
FIG. 3 is a side view when
Figure 4:
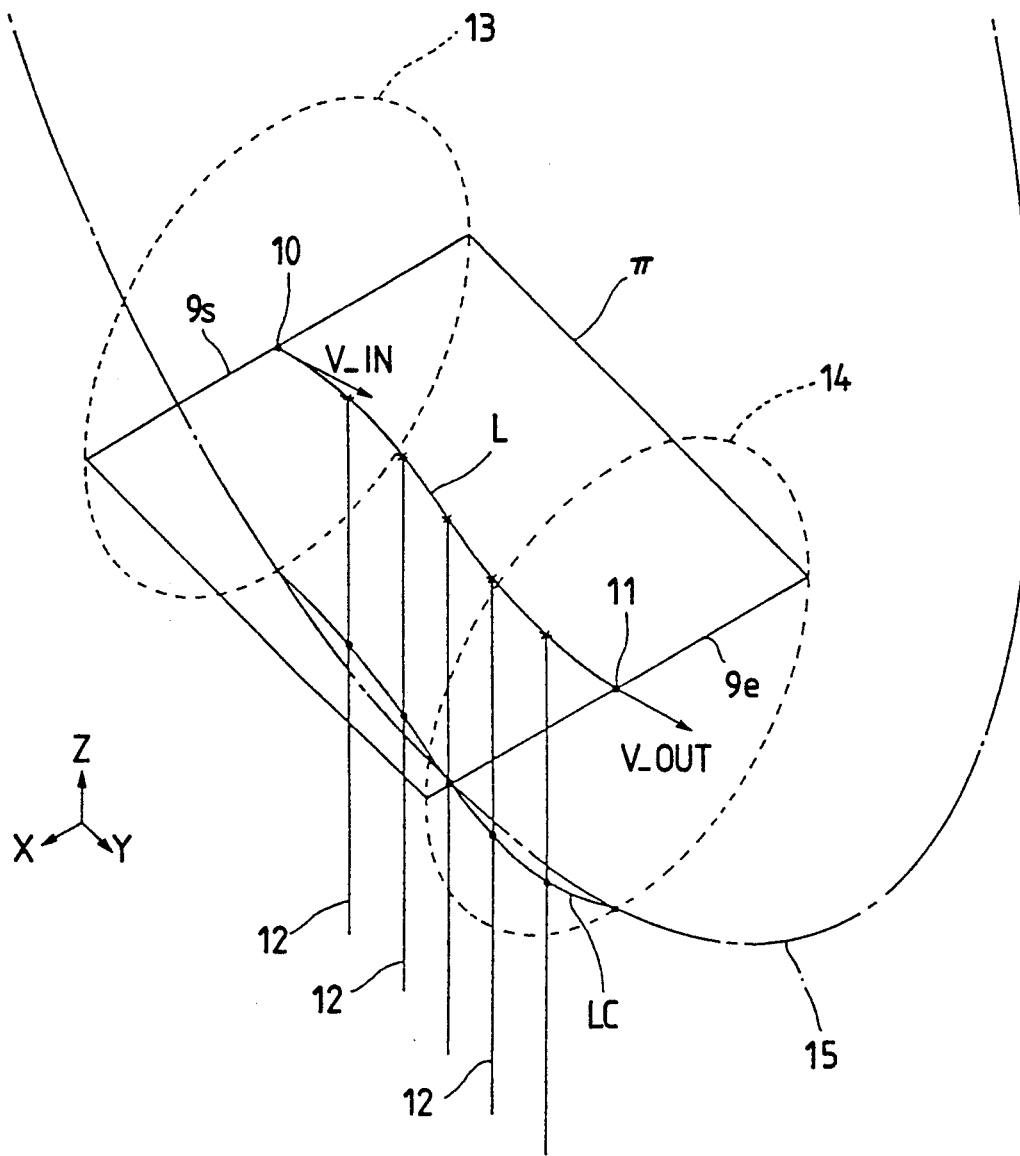
FIG. 4 is a perspective view showing the locus of the cutting tool of FIG. 1.

FIGS. 2-4 show the locus of the end mill in more detail.

In FIG. 2, a curve L on a parallelogram-like plane $\pi$ represents a projection of an end mill locus LC obtained by connecting foots (arranged at very small intervals) of perpendiculars from the points on the locus LC to the plane $\pi$, i.e., intersections of the x-y plane and perpendiculars 12, 12, . . . from the intermediate points on the locus LC where an orthogonal coordinate system is defined such that the x-y plane is a plane including the plane $\pi$ (the y-direction is generally in parallel with the locus LC) and that the z-axis is perpendicular to the x-y plane. In the plane $\pi$, a tangential vector at the center 10 of the side 9s on the end mill entrance side corresponds to the vector V_IN, and a tangential vector at the center 11 of the side 9e, which is opposite to the side 9s, corresponds to the vector V_OUT.

An imaginary circle 13 indicated by the broken line is a circle having the point 10 as its center and passing the two points on the side 9s (i.e., passing the two longitudinal boundary lines of the plane $\pi$). Another imaginary circle 14 indicated by the broken line is a circle having the point 11 as its center and passing the two points on the side 9e ( i.e., passing the two longitudinal boundary lines of the plane $\pi$). These imaginary circles are obtained as an envelope of the end mill (cutting tool).

In FIG. 2, an imaginary circle 15 indicated by the one-dot chain line and having a large radius of curvature represents a spherical surface defining the cutting depth in the end mill advancing direction, and is perpendicular to the plane $\pi$ and contained in the plane including the points 10, 11.

FIG. 3 is drawn when FIG. 2 is seen from the side (i.e., from the x-direction). The points on the locus are intersections (indicated by marks "x") of the spherical surface represented by the circle 15 and the perpendiculars, and the tip locus of the end mill is a curve obtained by connecting those intersections over respective very small intervals.

FIGS. 2-4 representatively show the case in which the end mill enters the machining area at the center 10 of the side 9s and exits from the center 11 of the side 9e to enter the next machining area. However, it is apparent that the other loci having different start and end points are determined according to the similar procedure, where the movement of the end mill is controlled so that the magnitudes of the vectors V_IN and V_OUT become smaller as the locus reaches the longitudinal lines 8, 8, . . . .

Figure 7:
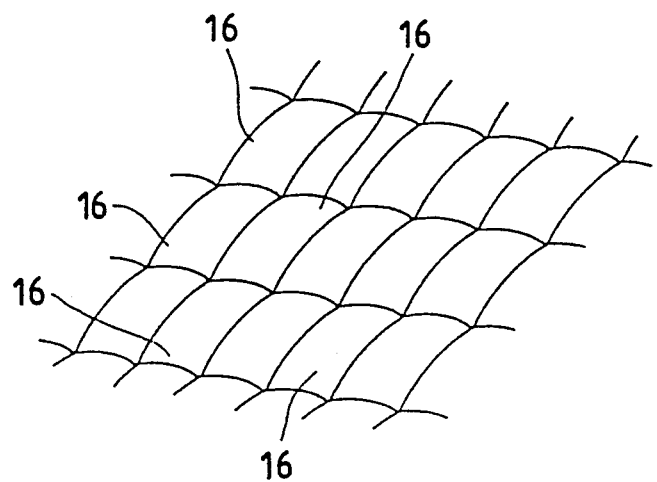
FIG. 7 is a perspective view schematically showing the main part of fisheye steps, that are produced using the die of the embodiment, on a curved portion of an outer lens.
Figure 18:
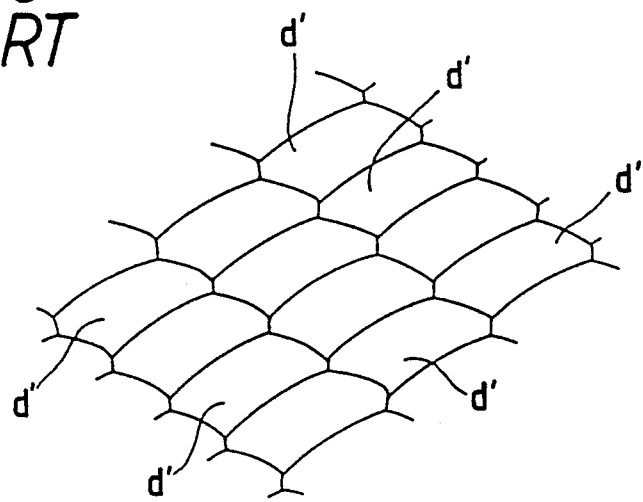
FIG. 18 is a perspective view schematically illustrating the main part of fisheye steps, that are produced using a conventional die, on a curved portion of an outer lens.
Figure 19A:
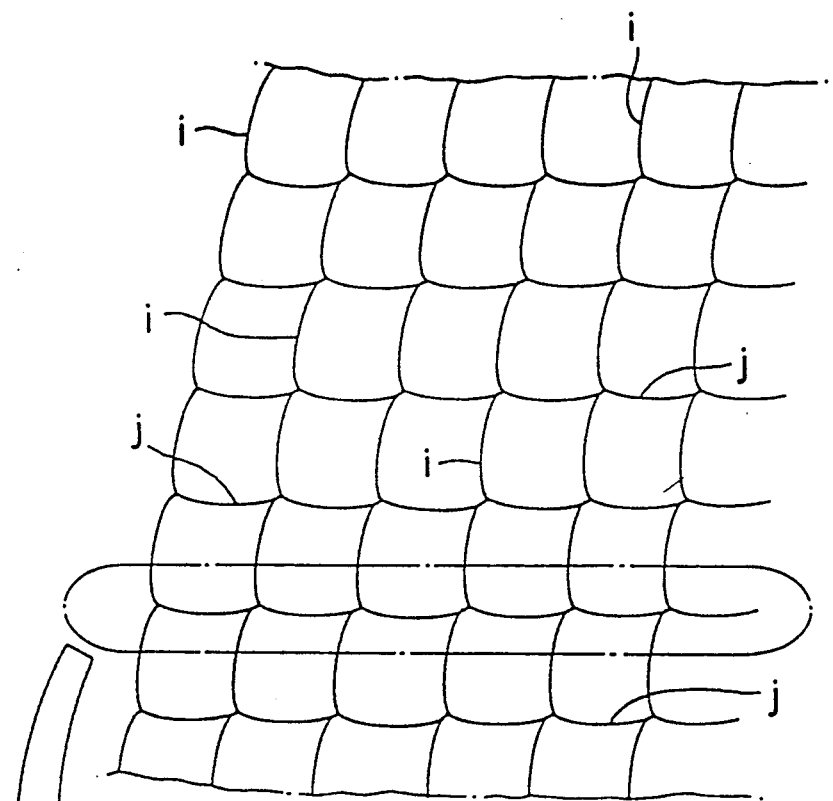
Figure 19B:
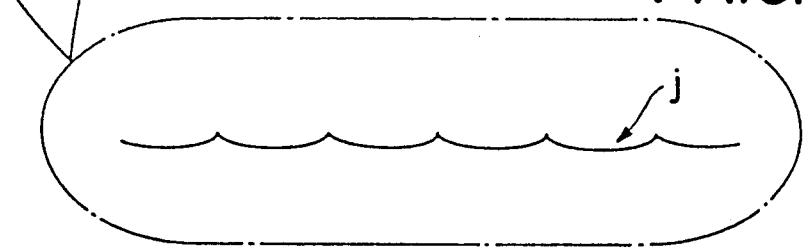

Thus, the lateral lines 9, 9, . . . and the longitudinal lines 8, 8, . . . are formed in a non-orthogonal manner to have a certain intersecting angle. As shown in FIG. 6, the adjacent lateral lines 9, 9, . . . are connected to assume a line close to a straight line and extending in a direction B. Therefore, the degree of zigzagged connection of the lateral lines is reduced. FIG. 7 schematically shows fisheye steps 16, 16, . . . formed by the die that is produced according to the above method, to make a comparison with the fisheye steps d', d', . . . of FIG. 18.

The concave portions C2, C2, . . . are continuously formed (a series of machining operations by the end mill in the longitudinal direction can be performed continuously with feeding in the direction B) simply by controlling the movement of the end mill with the vector control at the time of the end mill's entering the concave portion and shifting to the next concave portion. Further, since the end mill movement control does not become very complex, the machining time is not increased considerably.

As is apparent from the above description, according to the invention, while there is a forming of a second group of boundary lines that are connected to become like a straight line and obliquely intersect the first group of boundary lines that divide the concave portions corresponding to the respective fisheye steps, the movement direction control is always performed so that the locus of the cutting tool becomes perpendicular to the second group of boundary lines that are expected to be the boundary lines of the concave portions when the cutting tool passes the second group of boundary lines. Therefore, the second group of boundary lines are connected in the lateral direction to assume a line close to a straight line, so that the boundaries of the fisheye steps formed on the curved portion of a lens will have a good appearance when seen through the lens and the time and work for modifying the die and the machining data can be saved.

Since the continuous machining can be performed without making the end mill movement control very complex, the machining time is not increased considerably.

Although the above embodiment is directed to the case in which the invention is applied to the manufacture of a die for fisheye steps that are formed on an outer lens of a vehicular lamp, the technical scope of the invention should not be interpreted as only covering such a case, but the invention apparently has a wide application field.

What is claimed is:

1. A method of producing from a die workpiece block a die to be used for forming, on a lens having a curved portion, a plurality of fisheye steps that are divided by boundary lines into generally parallelogram-like sections, said die being divided into a plurality of concave portions corresponding to the respective fisheye steps by a first group of boundary lines extending in a first direction and a second group of boundary lines extending in a second direction, said method comprising the steps of:
   (1) entering a cutting tool into a divided section of said die block corresponding to one concave portion while controlling an entrance movement direction of said cutting tool so that is locus becomes perpendicular to a start side boundary line comprising a first one of said second group of boundary lines and specified to become a boundary of said divided section;
   (2) moving said cutting tool relative to said die block so that said cutting tool proceeds generally in parallel with the boundary lines of said divided section belonging to said first group of boundary lines; and
   (3) controlling a relative exit movement direction of said cutting tool so that the new locus of said cutting tool becomes perpendicular to a specified end side boundary line comprising a second one of said second group of boundary lines, wherein:
   said second group of boundary lines is formed substantially as a straight line, said second group of boundary lines obliquely intersecting said first group of boundary lines.

2. In a method of producing from a die workpiece block a die to be used for forming, on a lens having a curved portion, a plurality of fisheye steps that are divided by boundary lines into generally parallelogram-like sections, said die being divided into a plurality of concave portions corresponding to the respective fisheye steps by a first group of boundary lines extending in a first direction and a second group of boundary lines extending in a second direction, wherein
continuous machining for a plurality of divided sections is performed by shifting, in the forming direction of said second group of boundary lines at very small intervals, said locus of said cutting tool that is generally in parallel with the forming direction of said first group of boundary lines, and wherein
said second group of boundary lines is formed substantially as a straight line, said second group of boundary lines obliquely intersecting said first group of boundary lines.

3. The method of producing a die as set forth in claim 2, wherein said continuous machining is performed by uniformly feeding said cutting tool in said first direction while controlling the entrance movement and exit movement of said cutting tool with velocity vector control.

* * * * *